United States Patent [19]

Rubin

[11] Patent Number: 5,164,169
[45] Date of Patent: Nov. 17, 1992

[54] ZEOLITE BETA

[75] Inventor: Mae K. Rubin, Bala Cynwyd, Pa.

[73] Assignee: Mobil Oil Corporation, Fairfax, Va.

[21] Appl. No.: 715,190

[22] Filed: Jun. 14, 1991

[51] Int. Cl.⁵ .............................................. C01B 33/34
[52] U.S. Cl. .................................................. 423/709
[58] Field of Search ............... 423/328, 329, 330, 277; 502/61, 69, 77, 79

[56] References Cited

U.S. PATENT DOCUMENTS

| | | | |
|---|---|---|---|
| 3,308,069 | 3/1967 | Wadlinger et al. | 423/328 |
| 3,386,801 | 6/1968 | Kuehl | 502/61 |
| 3,442,795 | 5/1969 | Kerr et al. | 423/328 |
| 3,769,386 | 10/1973 | Rundell et al. | 423/329 |
| 3,907,711 | 9/1975 | Riley et al. | 423/328 |
| 4,088,605 | 5/1978 | Rollmann | 502/69 |
| 4,089,929 | 5/1978 | Christophliemk et al. | 423/329 |
| 4,093,560 | 6/1978 | Kerr et al. | 208/120 |
| 4,331,641 | 5/1982 | Hinnenkamp et al. | 423/277 |
| 4,377,502 | 3/1983 | Klotz | 423/328 |
| 4,419,220 | 12/1983 | LaPierre et al. | 208/111 |
| 4,517,402 | 5/1985 | Dessau | 585/820 |
| 4,560,542 | 12/1985 | Robson | 423/328 |
| 4,642,226 | 2/1987 | Calvert et al. | 423/328 |
| 4,650,656 | 3/1987 | Dwyer et al. | 423/329 |
| 4,740,292 | 4/1988 | Chen et al. | 208/120 |
| 4,789,656 | 12/1988 | Chen et al. | 502/74 |
| 4,797,267 | 1/1989 | Kuehl | 423/329 |
| 4,828,679 | 5/1989 | Carmier et al. | 208/120 |
| 4,847,055 | 7/1989 | Chu | 423/328 |
| 4,911,823 | 2/1990 | Chen et al. | 208/67 |
| 4,923,690 | 5/1990 | Valyocsik et al. | 423/328 |
| 4,983,275 | 1/1991 | McWilliams et al. | 208/111 |

OTHER PUBLICATIONS

Charnell, J. F. *Crystal Growth* vol. 8, pp. 291–294 (1971).
Camblor et al *Zeolites*, vol. 11 pp. 202–210 (Mar., 1991).
Morris et al *Zeolites* vol. 11, pp. 178–183 (Feb., 1991).
Kuhl, G. H. "Crystallization of Zeolites in the Presence of a Complexing Agent" Molecular Sieve Zeolites I vol. 101 ACS 1971 pp. 63–75.

*Primary Examiner*—R. Bruce Breneman
*Attorney, Agent, or Firm*—Alexander J. McKillop; Charles J. Speciale; Jessica M. Sinnott

[57] ABSTRACT

A large crystal zeolite Beta having a broad range of silica-to-alumina ratios, i.e. 20→1000, is synthesized with a chelating agent, exemplified by a tertiary alkanolamine such as triethanolamine in the synthesis mixture along with organic directing agents such as tetraethylammonium hydroxide, tetraethylammonium bromide and tetraethylammonium fluoride. The highly silicious zeolite Beta is produced from a silica source comprising precipitated silica and high purity, high silica starter seeds.

42 Claims, No Drawings

ZEOLITE BETA

CROSS REFERENCE TO RELATED APPLICATIONS

Reference is made to U.S. patent application Ser. No. 07/715,270, filed on Jun. 14, 1991, entitled "Synthesis of Zeolite Beta". Cross Reference is also made to U.S. patent application Ser. No. 07/715,189, filed on Jun. 14, 1991. Both applications are incorporated herein by reference.

FIELD OF THE INVENTION

This invention relates to zeolite Beta, more specifically, a new process for synthesizing zeolite Beta using a chelating agent in the synthesis reaction mixture. The invention also relates to the use of a precipitated silica and starter seeds as the silica source in a reaction mixture which includes a chelating agent to achieve a highly silicious zeolite Beta.

BACKGROUND OF THE INVENTION

Zeolitic materials, both natural and synthetic, have been demonstrated to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. These materials have become known as molecular sieves because the dimensions of these pores can accept for adsorption molecules of certain dimensions and reject those of larger dimensions. Such molecular sieves, both natural and synthetic, include a wide variety of positive ion-containing crystalline silicates. These silicates can be described as rigid three-dimensional frameworks of $SiO_4$ and Periodic Table Group IIIA element oxide, e.g., $AlO_4$, in which the tetrahedra are cross-linked by the sharing of oxygen atoms whereby the ratio of the total Group IIIA element, e.g., aluminum, and silicon atoms to oxygen atoms is 1:2. The electrovalence of the tetrahedra containing the Group IIIA element, e.g., aluminum, is balanced by the inclusion in the crystal of a cation, e.g., an alkali metal or an alkaline earth metal cation. This can be expressed wherein the ratio of the Group IIA element, e.g., aluminum, to the number of various cations, such as Ca/2, Sr/2, Na, K or Li, is equal to unity. One type of cation may be exchanged either entirely or partially with another type of cation utilizing conventional ion exchange techniques. By means of cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite Z (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); zeolite ZSM-12 (U.S. Pat. No. 3,832,449); zeolite ZSM-20 (U.S. Pat. No. 3,972,983); zeolite ZSM-35 (U.S. Pat. No. 4,016,245); and zeolite ZSM-23 (U.S. Pat. No. 4,076,842), to name a mere few.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present analytical measurement techniques. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5. U.S. Pat. Nos. 4,061,724, 4,073,865 and 4,104,294 describe crystalline silicates of varying alumina and metal content.

It is generally known that the properties of zeolites can be influenced by changing the structural silica-to-alumina mole ratios. In synthesizing the zeolite the ratio can be varied by altering the relative amounts of the silica and alumina-containing precursor materials. For example, increasing the silica relative to the alumina usually results in a higher silica product. However, after a certain silica-to-alumina mole ratio is achieved, proportionally increasing the silica content of the reactants does not necessarily effect the silica-to-alumina mole ratio of the final product and can even hinder the formation of the desired final product.

Zeolite Beta is a known zeolite which is described in U.S. Pat. Nos. 3,308,069 and RE 28,341 both to Wadlinger, and reference is made to these patents for a general description of zeolite Beta. The zeolite Beta of Wadlinger is described as having a silica-to-alumina ratio going from 10 to 100 and possibly as high as 150.

Highly silicious zeolite Beta described as having silica-to-alumina ratios within the range of 20–1000 is disclosed in Valyocsik et al, U.S. Pat. No. 4,923,690. To achieve the high silica-to-alumina ratio the zeolite is only partly crystallized. As the zeolite becomes more fully crystalline, the silica-to-alumina ratio decreases. This is demonstrated in the examples which show achievement of highly silicious zeolite Beta at between 30 and 50% crystallinity. It would be desirable to achieve a highly silicious zeolite Beta which is fully crystalline.

The description of the zeolite Beta of the Wadlinger patents is silent as to the crystallite size. Typically, however, the zeolite Beta produced by the Wadlinger method is a small crystal zeolite Beta having a crystal size ranging from 0.01 to 0.05 microns. For certain applications, large crystal zeolites have been found to possess distinct advantages over the smaller crystal zeolites.

Larger crystal zeolites are known to provide longer diffusion path lengths which can be used to modify catalytic reactions. By way of illustration only, in the medium pore zeolite ZSM-5, manipulating crystal size in order to change the selectivity of the catalyst has been described. A unique shape selective characteristic of ZSM-5 is the para-selectivity in toluene disproportionation and aromatics alkylation reactions. Increasing the size of the crystal, thereby lengthening the diffusion path, is just one way of achieving a high para-selectivity. The product selectivity occurs because an increase in the diffusion constraints is imposed on the bulkier, slower diffusing o- and m- isomers which reduces the production of these isomers and increases the yield of the para-isomer. N.Y. Chen et al, *Shape Selective Catalysis in Industrial Applications*, p.p. 51 (Marcel Dekker, Inc New York 1989) and N.Y. Chen et al, *Industrial Application of Shape Selective Catalysts*, p.p. 196 (Catal. Rev. Sci. Eng. 28 (2&3) 1986). Obtaining high selectivities in zeolite ZSM-5 by increasing the crystal size is described in U.S. Pat. No. 4,517,402 which is incorporated herein by reference. In U.S. Pat. No. 4,828,679 it is revealed that large crystal ZSM-5 type zeolites have improved octane gain and total motor fuel yield as well as improved steam stability. U.S. Pat. No. 4,650,656 describes a large crystal ZSM-5 which is synthesized by controlling the reaction conditions such as the rate of addition of the organics, the temperature, pH and the degree of agitation of the crystallization media. The application of an external gravitational force during the synthesis of silicalite has been described as a means for producing a large crystal zeolite in D. T. Hayhurst et al, "Effect of Gravity on Silicalite Crystallization" in *Zeolite Synthesis* p.p. 233 (M. L. Occelli Ed. American Chemical Society 1956). In J. F. Charnell, "Gel Growth of Large Crystals of Sodium A and Sodium X Zeolites", *Jour. Crystal Growth* 8, pp. 291-294, (North Holland Publishing Co., 1971), a method of synthesizing large crystal zeolite A and zeolite X is described in which, as the only organic reactant, triethanolamine is incorporated into the reaction mixture. A review of these publications reveals that a significant amount of attention has been directed to synthesizing large crystal zeolites yet none of the publications point to a consistent method for producing the large crystals. The crystal size of zeolite Beta was generally related to the silica-to-alumina mole ratio, the highly silicious zeolite Beta corresponding to a larger crystal size and the lower silica-to-alumina ratio corresponding to a smaller crystal size. Techniques for synthesizing a large crystal zeolite Beta covering a broad range of silica-to-alumina mole ratios, including the high as well as the low silica-to-alumina ratios, would be desirable.

SUMMARY OF THE INVENTION

A method for synthesizing zeolite Beta which has catalytic activity is described herein. The zeolite Beta is highly crystalline and is synthesized over a broad range of silica-to-alumina ratios in the as-synthesized form using a chelating agent along with a colloidal silica or a precipitated silica and seeds in the synthesis mixture.

It is an object of the invention to produce a highly crystalline zeolite Beta having a broad range of silica to alumina ratios.

It is a further object of the invention to produce a large crystal zeolite Beta.

It is a feature of the invention to synthesize zeolite Beta from a synthesis mixture containing a chelating agent in addition to a source of silica, caustic and an organic directing agent and, optionally alumina to provide a large crystal zeolite Beta which is fully crystalline and covers a broad range of silica to alumina ratios.

It is another feature of the invention to synthesize zeolite Beta with a chelating agent in the synthesis mixture along with a precipitated silica as the silica source and starter seeds to produce a fully crystalline highly silicious zeolite Beta.

It is still a further feature of the invention to synthesize zeolite Beta from silica sources having a high solids content.

In preparing as-synthesized highly silicious zeolites, silica is the major component of the reaction mixture. High silica levels in formulations of highly silicious zeolites, utilizing conventional procedures, become highly viscous as the silica increases and impede agitation of the synthesis mixture. An advantage of the instant invention is that it provides a highly crystalline highly silicious zeolite Beta which is synthesized without the problems associated with conventional high silica formulations.

DETAILED DESCRIPTION OF THE INVENTION

The method of synthesizing a highly crystalline zeolite Beta having a broad range of silica-to-alumina ratios comprises forming a synthesis mixture containing sources of alkali metal cations, organic nitrogen-containing cations, an oxide of aluminum, an oxide of silicon, a chelating agent and water and has a composition, in terms of mole ratios within the ranges recited in the following Table A:

TABLE A

|  | Broad | Preferred |
| --- | --- | --- |
| $SiO_2/Al_2O_3 =$ | 20->1000 | 70-1000 |
| $OH^-/SiO_2 =$ | 0.1-0.8 | 0.2-0.4 |
| $R/SiO_2 =$ | 0.3-1.0 | 0.3-0.9 |
| $H_2O/SiO_2 =$ | 5-40 | 5-15 |
| $M/SiO_2 =$ | 0.01-0.2 | 0.01-0.07 |
| $X/SiO_2 =$ | 0.1-1.0 | 0.2-0.8 |
| $R_1/R_1 + R_2 =$ | 0.1-1.0 | 0.2-0.8 |

R = organic nitrogen-containing cation
$R_1$ = tetraethylammonium hydroxide;
$R_2$ = tetraethylammonium halide;
M = alkali metal cation; and
X = chelating agent.

The mixture is maintained under conditions sufficient to crystallize the silicate.

The zeolite Beta is highly crystalline which means that the zeolite Beta is substantially free of amorphous silica and alumina unlike the partially crystalline zeolite Beta described in U.S. Pat. No. 4,923,690. In order to achieve high crystallinity the synthesis should be carried out until the product is at least about 70% crystalline, ranging from 80% to 130% crystalline, preferably at least about 90% crystalline as determined by traditional X-ray analysis techniques.

The reaction mixture for the synthesis of fully crystalline zeolite Beta can be prepared utilizing materials which supply the appropriate oxide. Such compositions include aluminates, alumina, precipitated silica, silica hydrosol, silica precursor, silica gel, silicic acid and hydroxides.

Each oxide component utilized in the reaction mixture for preparing the zeolite can be supplied by one or more essential reactants and they can be mixed together in any order. For example, any oxide can be supplied by an aqueous solution, sodium hydroxide or by an aqueous solution of a suitable silicate; the organic cation can be supplied by the directing agent compound of that cation, such as, for example, the hydroxide or salt, e.g. halide, such as chloride, iodide, fluoride or bromide. The reaction mixture can be prepared either batchwise or continuously.

The zeolite Beta can also be synthesized in the absence of other sources of zeolite framework elements such as aluminum. Thus, the zeolite synthesis mixture will be substantially free of added alumina or alumina source. However alumina may be present in the synthesis mixture as an impurity in the starting materials. As an impurity, alumina may be present in amounts of less than 0.6 wt. %, preferably, less than 0.2 wt. %.

The organic reactants include at least one organic directing agent which is an organic nitrogen-containing cation and a chelating agent which is a nitrogenous organic compound.

The directing agent for the present method is at least one tetraethylammonium compound or mixtures thereof: non-limiting examples of the directing agent include the hydroxide and/or the halide, e.g., tetraethylammonium hydroxide (TEAOH), tetraethylammonium bromide (TEABr), tetraethylammonium chloride and tetraethylammonium fluoride (TEAF).

The chelating agent is a nitrogenous organic compound such as a tertiary alkanolamine. The preferred tertiary alkanolamine is triethanolamine. However, other possible tertiary alkanolamines include triisopropanolamine, 2,2-Bis(hydroxymethyl)-2,2',2''-nitrilotriethanol. Triethanolamine is described in *Hawley's Condensed Chemical Dictionary*, p.p. 1179–1180 N. I. Sax, et al, 11th Ed. (Van Nostrand Reinhold Company, N.Y. 1987) the description of triethanolamine being incorporated herein by reference.

The chelating agent allows a high silica content starting material, such as a precipitated silica, to be used in synthesizing the highly silicious zeolite Beta. The chelating agent helps to fluidize the high silica-content mixture which facilitates stirring or agitating the mixture during formation of the zeolite. The chelating agent also allows less water to be used in the synthesis mixture (i.e., $H_2O/SiO_2$, ranging from 5 to 10) which favors formation of the pure, fully crystalline material. Excess water is undesirable because it results in the formation of an impure product which contains materials other than zeolite Beta, such as ZSM-12. Although extra tetraethylammonium hydroxide can be used to supply adequate fluidity, it is not an economical alternative and does not dependably produce fully crystalline large crystals.

The zeolite Beta composition as prepared hereby can be identified, in terms of mole ratios of oxides and in the as synthesized anhydrous state, as follows: (3 to 60)$R_2O$:(0.5 to 12)$M_{2/n}O$:$Al_2O_3$ (20 to >1000)$SiO_2$ where M is the alkali metal cation and R represents the organic cations. The term organic cation as used here includes the organic directing agent and the chelating agent.

The zeolite Beta described herein is considered a large crystal having been synthesized in crystal sizes from at least 0.1 to 0 2 microns ranging from 0.2 to 3.0 microns, more specifically from 0.2 to 2.0 microns. This is a significant advance in magnitude over the small crystal zeolite Beta which ranges in crystal size from 0.01 to 0.05 microns.

The determination of crystal size, is described in more complete detail in U.S. Pat. No. 4,828,679 which is incorporated herein by reference. Basically, crystal size is determined by conventional scanning electron microscopy (SEM) or transmission electron microscopy (TEM). The minimum crystal size of a given crystal is taken as the dimension of a reference. The amount of large crystal zeolite Beta synthesized in accordance with this invention can be present in predominant proportions; i.e., exceeding 50 wt. % and preferably may constitute up to 100 wt. % of the total zeolite synthesized.

In the method of forming the highly silicious zeolite material, which is defined as such by having a silica-to-alumina ratio over 100, preferably in a range of 200 to >1000, an amorphous precipitated silica or silica precursor can be the silica source. The precipitated silica precursors contain clustered solids which exhibit low viscosities even at high solids content in the synthesis mixture and have a solids (silica) content of at least about 10 wt. %, preferably from 30 to 90 wt. %. Precipitated silica is formed from the vapor phase or by precipitation from solution such as sodium silicate solution. The process is described in more complete detail in Kirk-Othmer's "Encyclopedia of Chemical Technology" 3rd Ed., Vol. 20, p.p. 776 (John Wiley & Sons, 1982) which is incorporated herein by reference. The precipitated silica may range in particle size from 0.01 to 100 microns, preferably having a size of about 0.02 microns. The advantage of using a precipitated silica is that the reaction mixture has a higher solids content, greater than about 10 wt. % by weight which effects cost reduction. Representative examples of commercially available precipitated silicas include the solid silicas, Ultrasil (a precipitated, spray dried silica containing about 90 wt. % silica), HiSil (a precipitated hydrated silica containing about 87 wt. % silica) and RTM.

A silica source which can also be used as the source for silica is an amorphous silica precipitate made from a solution of soluble silica source which is called a silica precursor. This silica precursor is described in U.S. Pat. No. 4,983,275 and the description of the silica sources are incorporated herein by reference.

In preparing the highly silicious zeolites using a precipitated silica, special starter seeds are included in the reaction mixture. The special seeds are preferably highly silicious e.g., having a silica-to-alumina mole ratio of at least 70 and high purity zeolite Beta. Low silica seeds are undesirable as they tend to promote the formation of a product containing impurities such as ZSM-12 or ZSM-5. The reaction mixture for the special seeds comprises sources of alkali metal cations, oxides of aluminum, oxides of silicon and at least one organic directing agent and water. The special starter seeds may or may not contain added alumina. Thus, in the high silica seeds reaction mixture any alumina contained in the synthesis mixture may exist as an impurity. The mixture can, optionally contain the chelating agent. The final zeolite Beta product can also be "self-seeding" which means that the reaction synthesis for the starter seeds is almost identical to the reaction synthesis for the final product.

The silica-to-alumina ratios referred to herein are the framework ratios. Thus, as known in the art, the ratio of the $SiO_4$ to the $AlO_4$ tetrahedra make up the structure of the zeolite Beta. The ratio may vary from the ratio determined by various known physical and chemical methods which are described more completely in U.S. Pat. No. 4,419,220 which is incorporated herein by reference.

Crystallization of the material can be carried out at either static or stirred conditions. The agitation can vary from 0 to 400 rpms, in a suitable reactor vessel. Suitable vessels include polypropylene, teflon coated or stainless steel autoclaves. The range of temperatures necessary to fully crystallize the zeolite Beta range from about 70° C. to 175° C., preferably about 140° C. The amount of time required for crystallization ranges from about at least 16 hours to 90 days. Thereafter, the crystals are recovered.

The hydrogen form of the as-synthesized zeolite can be prepared by calcining in air in an inert atmosphere at a temperature ranging from 200° C. to 900° C. or higher and exchange of the alkali metal cation.

The hydrogen form of the highly silicious zeolite was found to have a low alpha value, a low value being characterized as at least about 1, ranging from 1 to 50. When alpha value is examined, it is noted that the alpha value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 sec$^{-1}$). The alpha test is described in U.S. Pat. 3,354,078; in the *Journal of Catalysis*, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis* Vol. 61, p. 395. The higher alpha values correspond with a more active catalyst.

The original cation can be replaced, at least in part, by calcination and/or ion exchange with another cation. Thus, the original cations are exchanged into a hydrogen or hydrogen ion precursor form or a form in which the original cation has been replaced by a metal of Groups IIA, IIIA, IVA, IIIB, IVB, VIB or VIII of the Periodic Table of the Elements. Thus, for example, the original cations can be exchanged with ammonium cations or hydronium ions. Catalytically active forms of these would include, in particular, hydrogen, rare earth metals, aluminum metals of Groups II and VII of the Periodic Table and manganese. The original cation can be replaced by methods which include ion exchange, impregnation or by physical admixture.

The X-ray diffraction patterns of the crystalline silicate identified as zeolite Beta are shown in U.S. Pat. No. 3,308,069, herein incorporated by reference, in its entirety. The known methods of structural determination used to evaluate the instant zeolite Beta will be found there as well. The X-ray diffraction pattern of crystalline silicate having the structure of zeolite Beta made in accordance with the instant invention has the characteristic lines which fall within the ranges of the general zeolite Beta pattern.

Steaming, a known technique, can be used to increase the silica-to-alumina ratio. Steaming is conducted with 0.01 to 1.0 atm. of water in air at a temperature of at least 600° F., preferably at least about 650° F. for about 1 to 48 hours, preferably 3 to 24 hours. To increase the silica-to-alumina ratio further the catalyst can be subjected to acid treatment with a mineral acid alone or along with the steam treatment. Such methods are described, in further detail in U.S. Pat. No. 4,740,292 which is incorporated herein by reference, in its entirety.

It is often desirable to incorporate the zeolites into a material resistant to the temperature and other conditions employed in the process. Such matrix materials include synthetic and naturally occurring substances, such as inorganic materials, e.g., clay, silica and metal oxides. The latter may be either naturally occurring or in the form of gelatinous precipitates or gels, including mixtures of silica and metal oxides. Naturally occurring clays can be composited with the zeolites, including those of the montmorillonite and kaolin families. These clays can be used in the raw state as originally mined or initially subjected to calcination, acid treatment or chemical modification to enhance their activity. The relative proportions of zeolite component and inorganic oxide gel matrix on an anhydrous basis may vary widely with the zeolite content ranging from 5 to 80, more usually 10 to 70 wt % of the dry composite. The matrix itself may possess catalytic properties, generally of an acidic nature.

In addition to the foregoing materials, the zeolite Beta catalyst can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. A mixture of these components can also be used. The relative proportions of the crystalline silicate and inorganic oxide gel matrix may vary widely with the crystalline silicate content ranging from about 1 to 90 percent by weight, usually from about 2 to about 50 percent by weight of the composite.

Catalyst Application

While the crystalline silicate of the present invention may be used in a wide variety of organic compound conversion reactions, it is notably useful in cracking, hydrocracking, lubricant dewaxing, wax isomerization, olefin isomerization, oxygenate formation and olefin polymerization (oligomerization).

In catalytic dewaxing, the base-exchanged highly silicious zeolite Beta will be most suitable. A catalytic dewaxing process using zeolite Beta is described in U.S. Pat. No. 4,419,220 to LaPierre et al, the entire contents of which are incorporated by reference. The process is preferably carried out in the presence of hydrogen at temperatures ranging from about 250° C. to 500° C. under conditions of pressure ranging from atomospheric to 25,000 kPa (3,600 psig), the higher pressures being preferred. The n-paraffins of the feed are isomerized to form branched chain products.

In catalytic cracking, the zeolite Beta can be used as a stand alone or an additive catalyst along with another molecular sieve cracking component, typically a faujasite, representative examples of which include a Y-type zeolite such as REY, USY, RE-USY, dealuminated Y and silicon-enriched Y. The molecular sieve catalyst can also be ZSM-5. A more complete description of the use of zeolite Beta in cracking reactions can be found in U.S. Pat. No. 4,740,292.

The following examples describe the invention in more complete detail.

EXAMPLE 1

Colloidal silica (30% solids), 101.4 parts, is added to a containing 1.0 part of sodium aluminate (43.3% Al$_2$O$_3$, 32.2 % Na$_2$O), 55.8 parts of 40% tetraethylammonium hydroxide solution (TEAOH), 64.8 parts of 50% tetraethylammonium bromide solution (TEABr) and 31.5 parts of tetraethylammonium bromide solid. To this is added 17.0 parts of triethanolamine (TEA).

The composition of the reaction mix is as follows, in mole ratios:

| | |
|---|---|
| SiO$_2$/Al$_2$O$_3$ = | 119 |
| OH$^-$/SiO$_2$ = | 0.32 |
| R$_1$ + R$_2$/SiO$_2$ = | 0.90 |

|   |   |
|---|---|
| H₂O/SiO₂ = | 15.0 |
| Na⁺/SiO₂ = | 0.02 |
| TEA/SiO₂ = | 0.22 |
| R₁/R₂ + R₂ = | 0.33 | where $R_1$=TEAOH and $R_2$=TEABr.

The mixture is crystallized in a static reactor at 143° C. for 8 days. The solid product is filtered, water washed and dried at 120° C.

The X-ray analysis of the product is zeolite Beta, 115% crystallinity. Scanning electron micrographs of the material show crystals of 0.5–0.75 micron size. The chemical composition of the product is, in wt. %:

|   |   |
|---|---|
| C | 9.69 |
| N | 1.71 |
| Na | 0.45 |
| Al₂O₃ | 1.1 |
| SiO₂ | 75.6 |
| Ash | 77.7 |
| SiO₂/Al₂O₃ | 117 | the sorption capacities, after calcining for 3 hours at a 538° C. are, in wt. %:

|   |   |
|---|---|
| Cyclohexane, 40 Torr | 21.2 |
| n-Hexane, 40 Torr | 17.9 |
| H₂O, 12 Torr | 20.6 |
| Surface area, m²/g | 600 |

The product of this Example is determined to have the X-ray diffraction pattern shown below:

TABLE 2

X-ray Diffraction Pattern of Zeolite Beta

| 2-Theta | d(Angstroms) | I/I₀ |
|---|---|---|
| 7.58 | 11.65 | 11 |
| 11.66 | 7.58 | 2 |
| 16.64 | 5.32 | 5 |
| 17.88 | 4.96 | 2 |
| 18.34 | 4.83 | 2 |
| 21.58 | 4.11 | 16 |
| 22.61 | 3.93 | 100 |
| 25.46 | 3.50 | 7 |
| 26.85 | 3.32 | 16 |
| 29.04 | 3.07 | 3 |
| 29.61 | 3.01 | 14 |
| 30.68 | 2.91 | 4 |
| 33.57 | 2.67 | 4 |
| 34.68 | 2.58 | 2 |
| 43.90 | 2.07 | 11 |
| 44.63 | 2.03 | 2 |
| 49.90 | 1.83 | 2 |
| 52.66 | 1.74 | 2 |
| 55.22 | 1.66 | 3 |

EXAMPLE 2

Colloidal silica (30%) 84.2 parts, is added to a solution containing 1.0 parts sodium aluminate (43.3% Al₂O₃, 32.2% Na₂O), 73.7 parts H₂O, 6.8 parts tetraethylammonium fluoride (TEAF), 33.2 parts 40% tetraethylammonium hydroxide solution (TEAOH) and 10.5 parts triethanolamine (TEA).

The composition of the reaction mixture in mole ratios is as follows:

|   |   |
|---|---|
| SiO₂/Al₂O₃ = | 99 |
| OH⁻/SiO₂ = | 0.44 |
| R₁ + R₂/SiO₂ = | 0.32 |
| H₂O/SiO₂ = | 20.6 |
| Na⁺/SiO₂ = | 0.22 |
| R₁/R₂ + R₂ = | 0.66 |
| TEA/SiO₂ = | 0.17 | where $R_1$=TEAOH and $R_2$=TEAF

The mixture is crystallized in a static reactor at 130° C. for 21 days. The solid product is filtered, water washed and dried at 120° C.

Scanning electron micrographs of the material reveal crystals of 0.3–1.0 micron in size. The X-ray analysis of the product shows it to be zeolite Beta, 110% crystalline, with the characteristic lines shown in Table 3:

TABLE 3

| Interplanar d-Spacing (A) | Relative Intensity (I/I₀) |
|---|---|
| 11.5 ± 0.3 | M-S |
| 7.4 ± 0.2 | W |
| 6.6 ± 0.15 | W |
| 4.15 ± 0.1 | W |
| 3.97 ± 0.1 | VS |
| 3.00 ± 0.07 | W |
| 2.05 ± 0.05 | W |

The chemical composition of the product is in wt. %:

|   |   |
|---|---|
| N = | 1.62 |
| Na = | 0.29 |
| Al₂O₃ = | 2.8 |
| SiO₂ = | 74.5 |
| Ash = | 79.7 |
| SiO₂/Al₂O₃ = | 45.2 |

EXAMPLE 3

Colloidal silica (30% SiO₂), 101.4 parts, is added to a solution containing sodium aluminate 1.0 parts, 55.8 parts 40% tetraethylammonium hydroxide (TEAOH) solution, 64.8 parts 50% tetraethylammonium bromide (TEABr) solution, 31.5 parts solid TEABr and 17.0 parts triethanolamine (TEA).

The composition of the reaction mixture in mole ratios is as follows:

|   |   |
|---|---|
| SiO₂/Al₂O₃ = | 119 |
| OH⁻/SiO₂ = | 0.32 |
| R₁ + R₂/SiO₂ = | 0.90 |
| R₁/R₁ + R₂ = | 0.33 |
| H₂O/SiO₂ = | 15.0 |
| Na⁺/SiO₂ = | 0.02 |
| TEA/SiO₂ = | 0.22 | where $R_1$=TEAOH and $R_2$=TEABr

The mixture is crystallized in a static reactor at 140° C. for 8 days.

The X-ray analysis of the washed, dried (120° C.) material was zeolite Beta, 125% crystalline. The material has the characteristic X-ray diffraction shown in Table 2. Scanning electron micrographs show crystals of 0.3–0.5 microns.

The chemical composition of the product was, in wt. %:

|   |   |
|---|---|
| N = | 1.70 |
| Na = | 0.53 |

| | |
|---|---|
| $Al_2O_3 =$ | 1.2 |
| $SiO_2 =$ | 75.2 |
| Ash = | 78.1 |
| $SiO_2/Al_2O_3 =$ | 106 |

The sorption capacities, after calcining for 16 hours at 538° C. are, in wt. %:

| | |
|---|---|
| Cyclohexane, 40 Torr | 20.6 |
| n-Hexane, 40 Torr | 18.1 |
| $H_2O$, 12 Torr | 15.5 |
| Surface area, m2/g | 617 |

The following examples demonstrate the synthesis of highly silicious zeolite Beta synthesis in which the silica sources are precipitated silica and starter seeds.

EXAMPLE 4

Ultrasil, precipitated silica, 11.5 parts, is added to a solution containing 1 part 50% NaOH solution, 40% tetraethylammonium hydroxide (TEAOH) solution 20.3 parts, triethanolamine (TEA) 17.3 parts and $H_2O$, 4.92 parts. To this mixture is added 1.18 parts of zeolite Beta seeds (78% solids, 110/1 $SiO_2/Al_2O_3$). The mixture has the following composition in mole ratios:

| | |
|---|---|
| $OH^-/SiO_2 =$ | 0.39 |
| $R/SiO_2 =$ | 0.32 |
| $H_2O/SiO_2 =$ | 5.65 |
| $Na^+/SiO_2 =$ | 0.07 |
| $TEA/SiO_2 =$ | 0.67 |

Where R=TEAOH

Any alumina present exists as an impurity in the silica source.

The mixture is crystallized, with stirring, 300 rpm, for hours at room temperature, followed by 10 days at 135° C. The X-ray analysis shows the product to be zeolite Beta, 95% crystalline, with a trace of unidentified crystalline material. The scanning electron micrographs shows the material to be 0.3–0.8 microns in size.

The chemical composition of the product is, in wt. %:

| | |
|---|---|
| N | 1.61 |
| Na | 1.1 |
| $Al_2O_3$ | 0.20 |
| $SiO_2$ | 75.5 |
| Ash | 78.4 |
| $SiO_2/Al_2O_3$ | 642 |

The sorption capacities, after calcining for 3 hours at 538° C. are, in wt. %:

| | |
|---|---|
| Cyclohexane, 40 Torr. | 13.5 |
| n-Hexane, 40 Torr. | 10.8 |
| $H_2O$, 12 Torr | 4.9 |
| Surface area, m2/g | 333 |

EXAMPLE 5

This example demonstrates the preparation of the high silica, high purity seeds used in several of the examples. 33.8 Parts of Ultrasil 90% solids, precipitated silica, were added to a solution containing 1 part of sodium aluminate (43.3% $Al_2O_3$, 32.2% $Na_2O$), 55.8 parts of 40% tetraethylammonium hydroxide solution (TEAOH) and 127.9 parts of 50% tetraethylammonium bromide (TEABr) solution. The composition of the reaction mixture in mole ratios:

| | |
|---|---|
| $SiO_2/Al_2O_3 =$ | 119 |
| $OH^-/SiO_2 =$ | 0.32 |
| $R_1 + R_2/SiO_2 =$ | 0.90 |
| $H_2O/SiO_2 =$ | 10.7 |
| $Na^+/SiO_2 =$ | 0.02 |
| $R_1/R_1 + R_2 =$ | 0.33 | where $R_1$=TEAOH, $R_2$=TEABr

The mixture was crystallized at 138° C., 45 rpm, for 51 hours. At that time, x-ray analysis showed it was beta zeolite, 110% crystalline.

The chemical composition of the product was, in wt. %:

| | |
|---|---|
| N | 2.01 |
| Na | 0.59 |
| $Al_2O_3$ | 0.98 |
| $SiO_2$ | 74.3 |
| Ash | 76.9 |
| $SiO_2/Al_2O_3$ | 129 |

The sorption capacities, after calcining for three hours at 538° C. are, in wt. %:

| | |
|---|---|
| Cyclohexane, 40 Torr | 22.1 |
| $H_2O$, 12 Torr | 15.0 |
| Surface Area, $m^2/g$ | 681 |

EXAMPLE 6

Ultrasil, 90% solids, 11.5 parts, was added to a solution containing one part of 50% NaOH solution, 20.3 parts of 40% TEAOH solution, 17.3 parts of triethanolamine (TEA) and 4.92 parts of $H_2O$. To this slurry, was added 1.13 parts of the seeds from example 5. The mixture had the following composition in mole ratios:

| | |
|---|---|
| $OH^-/SiO_2 =$ | 0.39 |
| $R/SiO_2 =$ | 0.32 |
| $H_2O/SiO_2 =$ | 5.6 |
| $Na^+/SiO_2 =$ | 0.07 |
| TEA/Si = | 0.67 |

The mixture was crystallized at 45 rpm, for 16 hours at room temperature, followed by 23 hours at 138° C. The x-ray analysis of the washed, dried (120° C.) product was beta zeolite, 105% crystalline.

The chemical composition of the product was, in wt. %:

| | |
|---|---|
| N | 1.91 |
| Na | 0.36 |
| $Al_2O_3$, ppm | 1580 |
| $SiO_2$ | 72.3 |
| $SiO_2/Al_2O_3$ | 778 |

The sorption capacities, after calcining for three hours at 538° C. are, in wt. %:

| | |
|---|---|
| Cyclohexane, 40 Torr | 20.0 |
| $H_2O$, 12 Torr | 7.2 |

-continued

| | |
|---|---|
| Surface area, m²/g | 501 |

A portion of the product of this example was calcined in air for three hours at 538° C., ammonium exchanged and converted to the hydrogen form. It had an alpha value of 12.

EXAMPLE 7

The same reactants as in Example 6 were used, except that 0.75 parts of Example 5 seeds were used. The mixture was crystallized at 45 rpm for 16 hours at room temperature, followed for 28 hours at 138° C. The x-ray analysis of the washed product showed zeolite beta, 100% crystalline. The chemical composition of the product was, in wt. %:

| | |
|---|---|
| N | 1.85 |
| Na | 0.78 |
| $Al_2O_3$ | 0.27 |
| $SiO_2$ | 73.8 |
| Ash | 77.1 |
| $SiO_2/Al_2O_3$ | 465 |

The sorption capacities, after calcining for three hours at 538° C. are, in wt. %:

| | |
|---|---|
| Cyclohexane, 40 Torr | 21.7 |
| $H_2O$, 12 Torr | 16.0 |

A portion of the material obtained in this example was calcined in air, ammonium exchanged and converted to the hydrogen form. The alpha value of this example was 7.

EXAMPLE 8

The procedure of example 6 was repeated, except that 0.56 parts of Example 5 seeds were used. The mixture was crystallized for 16 hours at room temperature followed by 40 hours at 138° C. The washed product was identified as beta zeolite, 100% crystalline.

The chemical composition of the product was, in wt. %:

| | |
|---|---|
| N | 1.86 |
| Na | 0.82 |
| $Al_2O_3$ | 0.23 |
| $SiO_2$ | 71.3 |
| Ash | 72.5 |
| $SiO_2/Al_2O_3$ | 527 |

The sorption capacities, after calcining for three hours at 538° C. are, in wt. %:

| | |
|---|---|
| Cyclohexane, 40 Torr | 18.9 |
| $H_2O$, 12 Torr | 14.6 |
| Surface area, m²/g | 527 |

The hydrogen form material of this example had an alpha value of two.

EXAMPLE 9

This example demonstrates self-seeding. The same reactants shown in example 6 were used, except that 0.56 parts of beta zeolite synthesized in example 6 were used to seed the reaction. The mixture was crystallized at 45 rpm for 16 hours at room temperature, followed by 143 hours at 138° C. The washed product was beta zeolite, 80% crystalline.

The chemical composition of the product was, in wt. %:

| | |
|---|---|
| N | 2.0 |
| Na | 1.6 |
| $Al_2O_3$, ppm | 1390 |
| $SiO_2$ | 77.7 |
| $SiO_2/Al_2O_3$ | 950 |

EXAMPLE 10

This is a comparative example which shows the importance of using high purity, high silica to alumina seeds.

The same reactants of example 6 were used. The seeds used were 1.13 parts of beta zeolite 65% crystalline, 38/1 silica to alumina. The mixture was crystallized 16 hours at room temperature, followed by 10 days at 138° C. The product was analyzed as a mixture of beta zeolite and ZSM-12.

EXAMPLE 11

This example demonstrates that a mixture of TEABr and TEAOH can be used in the synthesis. This would reduce production cost.

One part of 50% NaOH solution is added to a solution containing 15.2 parts of 40% TEAOH solution and 5.8 parts of 50% TEABr solution and 4.9 parts of $H_2O$. 17.4 parts of TEA are added, followed by 11.6 parts of precipitated silica and 1.2 parts of beta seeds (118/1 $SiO_2Al_2O_3$). The composition of the reaction mixture in mole ratios:

| | |
|---|---|
| $OH^-/SiO_2 =$ | 0.31 |
| $R_1 + R_2/SiO_2 =$ | 0.32 |
| $H_2O/SiO_2 =$ | 5.6 |
| $Na^+/SiO_2 =$ | 0.07 |
| $TEA/SiO_2 =$ | 0.67 |
| $R_1/R_1 + R_2 =$ | 0.75 |

The mixture was crystallized with stirring for 16 hours at room temperature followed by 10 days at 132° C. The product was analyzed as 100% beta zeolite.

The chemical composition of the product was, in wt. %:

| | |
|---|---|
| N | 1.65 |
| Na | 0.97 |
| $Al_2O_3$ | 0.22 |
| $SiO_2$ | 74.4 |
| $SiO_2/Al_2O_3$ | 575 |

The sorption capacities, after calcining for three hours at 538° C are, in wt. %:

| | |
|---|---|
| Cyclohexane, 40 Torr | 21.1 |
| $H_2O$, 12 Torr | 6.9 |
| Surface area, m²/g | 645 |

I claim:

1. A method of synthesizing a crystalline synthetic zeolite comprising a large crystal zeolite Beta which ranges in size from 0.1 to 3.0 microns having a silica to alumina ratio of at least 20 to about 200 which is substantially free of amorphous materials and having the structure of zeolite Beta prepared by:

(a) preparing a reaction mixture which contains one or more sources of alkali metal cations, organic cation which is a tetraethylammonium cation, chelating agent which is a tertiary alkanolamine, an oxide of silicon, water and an oxide of aluminum and having a reaction mixture in terms of mole ratios within the following ranges:

| | |
|---|---|
| $SiO_2/Al_2O_3 =$ | 20 to about 120 |
| $OH^-/SiO_2 =$ | 0.1 to about 0.5 |
| $R/SiO_2 =$ | 0.3 to about 1.0 |
| $H_2O/SiO_2 =$ | 5.0 to about 20.6 |
| $M/SiO_2 =$ | 0.01 to about 0.2 |
| $X/SiO_2 =$ | 0.1 to about 0.22 | where R is the organic cation, M is the alkali metal cation and X is the chelating agent;

(b) maintaining the reaction mixture under conditions sufficient to crystallize the zeolite Beta wherein said large crystal zeolite beta is substantially free of amorphous materials and has a silica-to-alumina ratio ranging from about 20 to about 200; and (c) recovering the crystalline zeolite Beta from step (b), the recovered zeolite containing at lest one organic cation and the chelating agent.

2. The method of claim 1 in which the source of oxide of silicon of their reaction mixture is selected from the group consisting of colloidal silica, precipitated silica and silica precursor.

3. The method of claim 2 in which the source of oxide of silicon is the precipitated silica or silica precursor and the reaction mixture further comprises zeolite Beta seeds having a silica-to-alumina ratio of at least 70.

4. The method of claim 1 in which the organic cation represented by R and the chelating agent represented by X of the zeolite Beta recovered in step (b) are converted at least in part to the hydrogen form by calcining and exchange.

5. The method of claim 1 in which maintaining the reaction mixture under conditions sufficient to crystallize the zeolite includes temperatures ranging from 70° C. to 175° C.

6. The method of claim 3 in which the crystalline zeolite Beta seeds are prepared by the synthesis as described in claim 1.

7. The method of claim 1 in which the organic cation source is selected from the group consisting of tetraethylammonium hydroxide, tetraethylammonium halide and a combination thereof.

8. The method of claim 7 in which the tetraethylammonium halide source is selected from the group consisting of tetraethylammonium bromide, tetraethylammonium chloride, and tetraethylammonium fluoride.

9. A process for the production of large crystal zeolite Beta having a crystal size ranging from 0.1 to 3.0 microns and a silica-to-alumina ratio of about 200 to about 1000 which is substantially free of amorphous materials comprising the steps of:

(a) preparing a reaction mixture which contains one or more sources of alkali metal cations, organic cation which is a tetraethylammonium cation, a chelating agent which is a tertiary alkanolamine, water, a source of aluminum, and a silica source which is an oxide of silicon and having a reaction mixture in terms of mole ratios within the following ranges:

| | |
|---|---|
| $SiO_2/Al_2O_3 =$ | greater than 70 |
| $OH^-/SiO_2 =$ | 0.2 to 0.4 |
| $R/SiO_2 =$ | 0.3 to 0.9 |
| $H_2O/SiO_2 =$ | 5 to 15 |
| $M/SiO_2 =$ | 0.01 to 0.07 |
| $X/SiO_2 =$ | 0.2 to 0.8 | where R is the organic cation, M is the alkali metal cation and X is the chelating agent, the reaction mixture also containing a plurality of zeolite beta seeds;

(b) maintaining the reaction mixture under conditions sufficient to crystallize the zeolite to produce a large crystal zeolite beta having a crystal size ranging from 0.1 to 3.0 microns which is substantially free of amorphous materials and which is substantially free of contaminants; and (c) recovering the crystalline zeolite beta.

10. The process of claim 9 in which the organic cation represented by R and the chelating agent represented by X of the zeolite Beta recovered in step (b) are converted at least in part into the hydrogen form by calcining and exchange.

11. The process of claim 9 in which maintaining the reaction mixture under conditions sufficient to crystallize the zeolite includes temperatures ranging from 70° C. to 175° C.

12. The process of claim 9 in which the organic cation source is selected from the group consisting of tetraethylammonium hydroxide, tetraethylammonium halide and a combination thereof.

13. The process of claim 12 in which the tetraethylammonium halide source is selected from the group consisting of tetraethylammonium bromide, tetraethylammonium chloride, and tetraethylammonium fluoride.

14. The process of claim 9 in which the silica source has a solids content of greater than about 78 wt %.

15. The process of claim 9 which includes the step of agitating the reaction mixture.

16. A process for the production of zeolite Beta having a silica-to-alumina mole ratio of at least about 465 which is substantially free of amorphous materials comprising the steps of:

(a) preparing a reaction mixture which contains one or more sources of alkali metal cations, organic cation which is a tetraethylammonium cation, a chelating agent which is a tertiary alkanolamine, water, and a silica source and having a reaction mixture in terms of mole ratios within the following ranges:

| | |
|---|---|
| $OH^-/SiO_2 =$ | 0.2 to 0.4 |
| $R/SiO_2 =$ | 0.3 to 0.9 |
| $H_2O/SiO_2 =$ | 5 to 15 |
| $M/SiO_2 =$ | 0.01 to 0.07 |
| $X/SiO_2 =$ | 0.2 to 0.8 | where R is the organic cation, M is the alkali metal cation and X is the chelating agent, the reaction mixture also containing a plurality of zeolite beta seeds which are highly silicious and high purity;

(b) agitating the reaction mixture under conditions of temperature, ranging from about 70° C. to about 140° C. and time ranging from about 16 hours to 10 days, sufficient to crystallize the zeolite to produce zeolite beta which is substantially free of amorphous materials wherein said chelating agent facilitates fluidization of the reaction mixture to produce the zeolite beta which is substantially free of contaminants; and (c) recovering the crystalline zeolite beta.

17. The process of claim 16 in which the organic cation represented by R and the chelating agent represented by X of the zeolite Beta recovered in step (b) are converted at least in part into the hydrogen form by calcining and exchange.

18. The process of claim 16 in which the organic cation source is selected from the group consisting of tetraethylammonium hydroxide, tetraethylammonium halide and a combination thereof.

19. The process of claim 18 in which the tetraethylammonium halide source is selected from the group consisting of tetraethylammonium bromide, tetraethylammonium chloride, and tetraethylammonium fluoride.

20. The process of claim 16 in which the silica source has a solids content ranging from 30 wt % to 90 wt. %.

21. The process of claim 20 in which the silica source has a solids content of at least 87 wt %.

22. The process of claim 16 in which the zeolite beta seeds have a silica-to-alumina mole ratio of at least 70.

23. The process of claim 16 in which the zeolite beta seeds are substantially free of amorphous materials.

24. The process of claim 23 in which the zeolite beta seeds are made from a reaction mixture which comprises one or more sources of alkali metal cations, organic cation which is a tetraethylammonium cation, an oxide of silicon, water and an oxide of aluminum and having a reaction mixture in terms of mole ratios within the following ranges:

| | |
|---|---|
| $SiO_2/Al_2O_3$ = | 70 to about 1000 |
| $OH^-/SiO_2$ = | 0.2 to 0.4 |
| $R/SiO_2$ = | 0.3 to 0.9 |
| $H_2O/SiO_2$ = | 5 to 15 |
| $M/SiO_2$ = | 0.01 to 0.07 | where R is the organic cation and M is the alkali metal cation.

25. The process of claim 24 in which the reaction mixture for the zeolite beta seeds includes a chelating agent, represented by X, which is a tertiary alkanolamine in a mole ratio of $X/SiO_2$ ranging from about 0.2 to 0.8.

26. A process for the production of zeolite beta by preparation a reaction mixture which includes one or more sources of alkali metal cations, tetraethylammonium cation, an oxide of silicon, water and an oxide of aluminum wherein the improvement comprises preparing a reaction mixture which includes one or more source of alkali metal cations, tetraethylammonium cation, an oxide of silicon, water, an oxide of aluminum and a chelating agent which is a tertiary alkanolamine, said reaction mixture having mole ratios within the following ranges:

| | |
|---|---|
| $SiO_2/Al_2O_3$ = | 20 to about 120 |
| $OH^-/SiO_2$ = | 0.1 to about 0.5 |
| $R/SiO_2$ = | 0.3 to about 1.0 |
| $H_2O/SiO_2$ = | 5.0 to about 20.6 |
| $M/SiO_2$ = | 0.01 to about 0.2 |
| $X/SiO_2$ = | 0.1 to about 0.22 | where R is the organic cation, M is the alkali metal cation and X is the chelating agent;

(b) maintaining the reaction mixture under conditions sufficient to crystallize the zeolite Beta having a large crystal size which ranges from about 0.1 to 3.0 microns, which is substantially free of amorphous materials, said large crystal zeolite Beta having a silica to alumina ratio of at least about 20 to about 200;

(c) recovering the zeolite Beta from step (b), the recovered zeolite containing at least one organic cation and the chelating agent.

27. The process of claim 26 in which the organic cation represented by R and the chelating agent represented by X of the zeolite Beta recovered in step (b) are converted at least in part into the hydrogen form by calcining and exchange.

28. The process of claim 26 in which maintaining the reaction mixture under conditions sufficient to crystallize the zeolite includes temperatures ranging from 70° C. to 175° C.

29. The process of claim 26 in which the organic cation source is selected from the group consisting of tetraethylammonium hydroxide, tetraethylammonium halide and a combination thereof.

30. The process of claim 29 in which the tetraethylammonium halide source is selected from the group consisting of tetraethylammonium bromide, tetraethylammonium chloride, and tetraethylammonium fluoride.

31. The process of claim 26 in which the zeolite beta has a silica-to-alumina mole ratio of 20 to about 100.

32. The process of claim 1 in which the zeolite beta has a silica-to-alumina mole ratio ranging from 20 to about 100.

33. In a process for the production of zeolite beta by preparing a liquid synthesis mixture from which zeolite beta crystallizes which includes one or more sources of alkali metal cations, tetraethylammonium cation, an oxide of silicon, water and an oxide of aluminum wherein the improvement comprises preparing a reaction mixture which includes one or more source of alkali metal cations, tetraethylammonium cation, oxide of silicon, water, oxide of aluminum and a tertiary alkanolamine, said reaction mixture having mole ratios within the following ranges:

| | |
|---|---|
| $SiO_2/Al_2O_3$ = | 20 to about 1000 |
| $OH^-/SiO_2$ = | 0.1 to about 0.8 |
| $R/SiO_2$ = | 0.3 to about 1.0 |
| $H_2O/SiO_2$ = | 5.0 to about 40.0 |
| $M/SiO_2$ = | 0.01 to about 0.2 |
| $X/SiO_2$ = | 0.1 to about 1.0 | where R is the tetraethylammonium cation, M is the alkali metal cation and X is the tertiary alkanolamine;

(b) maintaining the reaction mixture under conditions sufficient to crystallize the zeolite Beta which is substantially free of amorphous materials, said zeolite Beta having a silica to alumina ratio of at least 20 to about 1000; and (c) recovering the zeolite Beta from step (b), the recovered zeolite containing at least one organic cation and the chelating agent, said zeolite having a crystal size ranging from 0.1 to 3.0 microns.

34. The process of claim 33 in which the tetraethylammonium cation represented by R and the tertiary alkanolamine represented by X of the zeolite Beta recovered in step (b) are converted at least in part into the hydrogen form by calcining and exchange.

35. The process of claim 33 in which maintaining the reaction mixture under conditions sufficient to crystallize the zeolite includes temperatures ranging from 70° C. to 175° C.

36. The process of claim 33 in which the organic cation source is selected from the group consisting of tetraethylammonium hydroxide, tetraethylammonium halide and a combination thereof.

37. The process of claim 36 in which the tetraethylammonium halide source is selected from the group consisting of tetraethylammonium bromide, tetraethylammonium chloride, and tetraethylammonium fluoride.

38. The process of claim 33 in which the source of oxide of silicon is colloidal silica.

39. The process of claim 33 in which the source of silca is selected from the group consisting of precipitated silica and silica precursor.

40. The process of claim 39 wherein the improvement further comprises as a source of silica zeolite beta seeds having a silica-to-alumina mole ratio of at least 70.

41. The process of claim 40 in which the zeolite beta seeds are made by the process of claim 32.

42. A crystalline zeolite beta comprising the as-synthesized composition identified in terms of mole ratios of oxides in the anhydrous state:

(3 to 60)$R_2O$: (0.5 to 12)$M_{2/n}O$: $Al_2O_3$: (200 to 1000) $SiO_2$ where M is an alkali metal cation and R represents a tetraethylammonium cation and a tertiary alkanolamine, said zeolite beta having a crystal size ranging from 0.1 to 3.0 microns.

* * * * *